March 20, 1962   J. A. RODGERS ETAL   3,025,753
MOTION PICTURE PROJECTOR FOR TELEVISION
Filed Nov. 14, 1957
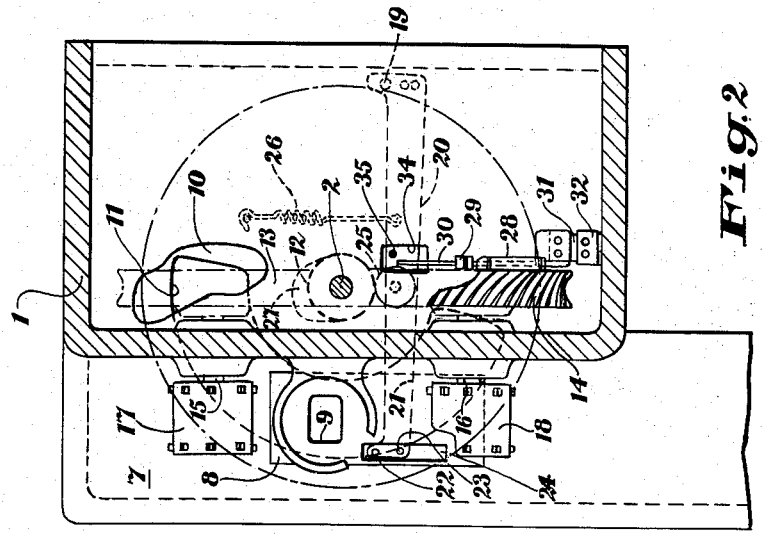
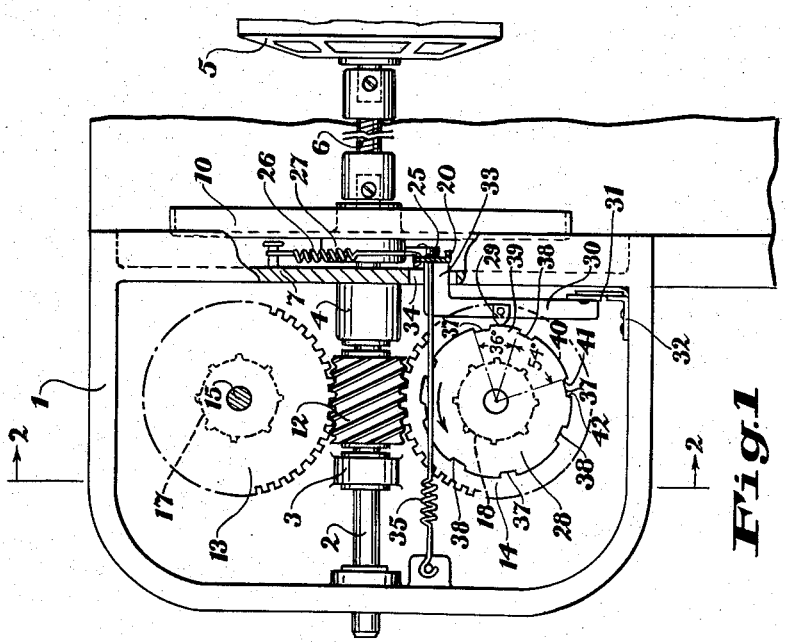
John A. Rodgers
Walter E. Taylor, Jr.
INVENTORS
BY R. Frank Smith
Robert T. Crocker
ATTORNEYS

United States Patent Office 3,025,753
Patented Mar. 20, 1962

3,025,753
MOTION PICTURE PROJECTOR FOR TELEVISION
John A. Rodgers and Walter E. Taylor, Jr., Rochester, N.Y., assignors to Eastman Kodak Company, Rochester, N.Y., a corporation of New Jersey
Filed Nov. 14, 1957, Ser. No. 696,551
6 Claims. (Cl. 88—18.4)

This invention relates to a motion picture projector in which the film pull-down and shutter actuation are so arranged as to make the projector, operating at the normal 24 frames-per-second speed, compatible with the conventional 60 fields-per-second television systems.

As is well known in the art, certain complications arise in projecting standard motion picture film for television pickup purposes due to the fact that the normal rate of operation of the conventional television systems is not an exact multiple of the standard motion picture projection rate. Thus, the usual television system provides for scanning 60 interlaced fields per second to give 30 complete TV frames per second, while the standard motion picture projector operates at the rate of 24 frames per second. Many systems have been devised to render motion picture projectors compatible for use with TV and, included in these systems are various arrangements for operating the projector with a staggered pull-down whereby one pull-down cycle corresponds to two TV fields while the next corresponds to three TV fields, etc. However, such arrangements as have heretofore been provided for this staggered or 2—3—2 pull-down have been relatively complicated and have required considerable modification of the usual standard projector.

It is therefore an object of this invention to provide such a projector wherein the desired 2—3—2 operation is readily obtained with but minor modification of a standard projector.

A further object is to provide such a projector wherein during each television field an image of the motion picture film will be projected onto the TV pickup tube for substantially one half of the field duration, having the remaining half field periods available for film pull-down at the desired staggered intervals.

A still further object is to provide such a projector utilizing a conventional pull-down claw and wherein the cam controlling the film engaging and disengaging motion of the claw is carried by one of the usual sprocket shafts, thereby greatly simplifying the construction.

Further objects will become apparent from the following description and claims, particularly when considered in the light of the accompanying drawing wherein:

FIG. 1 is a fragmentary side view of the film drive mechanism of a projector; and FIG. 2 is a transverse sectional view taken substantially on the plane indicated by the line 2—2 of FIG. 1 and with certain parts broken away and others removed, better to show the construction.

FIGS. 1 and 2 show a portion of a conventional motion picture projector including the usual feed mechanism housing 1, only so much of the mechanism being shown as directly relates to the invention. A shutter shaft 2 extends in a front-to-rear direction in this housing, being mounted for rotation as by means of suitable bearings 3 and 4. In the conventional motion picture projector this shutter shaft would normally be operated at a rate of 1440 r.p.m. However, in the present case, shutter shaft 2 is adapted to be driven by means of a 3600 r.p.m. synchronous motor 5, suitably coupled to the shaft 2 as by means of a flexible shaft 6.

The housing 1 includes a transverse wall 7 near the rear portion thereof, this wall extending laterally to one side of the housing 1 where it is provided with a conventional gate assembly 8 including the usual gate opening or aperture 9 extending therethrough. Mounted on shaft 2 rearwardly of wall 7 is a rotary shutter 10 provided with an arcuate opening 11 having an angular extent of substantially 180°. Thus, this shutter, as it rotates, will alternately cover and uncover the aperture 9 so as to intermittently block the normal projection beam emanating from a conventional light source (not shown). With this arrangement the shutter will effectively be open during one half of each television field, and closed during the remaining half.

Carried by the shaft 2 forwardly of the wall 7 is a worm gear 12 which meshes with mating gears 13 and 14 carried by the upper and lower sprocket shafts 15 and 16. These sprocket shafts carry on their outer ends the conventional upper and lower feed sprockets 17 and 18 which serve respectively to feed film to, and withdraw it from, the vicinity of the gate 8. The gear ratios are such that sprocket shafts 15 and 16 will rotate at a constant rate of 3 r.p.s. The sprockets 17 and 18 are so designed that one full revolution corresponds to the movement of eight motion picture frames through the projector so that with the above gear ratios the film will be fed to and from the gate at the usual 24 frames-per-second rate.

To intermittently move the film past the gate, a generally conventional claw type pull-down mechanism is employed. This comprises in this particular case a claw arm 20 pivotally mounted at one end on the rear side of wall 7 as diagrammatically indicated at 19. The mounting arrangement 19 may be of the type shown and described in U.S. Patent 2,521,957 and, as is clearly set forth therein, provides for both swinging movement of the arm in a vertical plane and also limited movement of the free end 21 of the arm toward and away from the plane of the film path adjacent the gate aperture 9. Claws 22 and 23, carried by the end 21 of claw arm 20, project forwardly therefrom through a suitable slot 24 formed in the gate assembly 8 so that, when the end 21 is swung forwardly these claws will be in position to engage the conventional sprocket holes of the motion picture film passing the gate.

Up-and-down or advance-and-return movement of the claws 22 and 23 are controlled by a cam-follower roller 25 rotatably carried by the claw arm intermediate its length and adapted to engage and coact with the peripheral surface of an up-and-down cam 27 carried on the forward face of the shutter 10. A suitable spring 26 serves to normally urge the claw arm roller 25 upwardly into engagement with the cam 27.

To control the in-and-out or film engaging and disengaging movements of the claws 22 and 23, a second cam 28, commonly known as the in-and-out cam, is carried by the lower sprocket gear 14. A follower 29 is rigidly carried by a lever 30, hingedly mounted on housing 1 by means of a short leaf spring 31 and bracket 32, and rides on the peripheral surface of cam 28. The upper end 33 of lever 30 extends rearwardly through a suitable opening 34 in the wall 7 and contacts the forward face of claw arm 20 intermediate its length. A spring 35 extending from the claw arm to a suitable anchor on the forward wall of housing 1 serves to urge the claw arm against the upper end of lever 30 and, at the same time, to urge the follower 29 against the cam 28.

The periphery of cam 28 is provided with four pairs of spaced notches 37 and 38 separated by lands 39 and 40, the leading edges 41 of the notches controlling the movement of the claws into film engaging position while the trailing edges 42 control the disengaging movement of the claws. The angular spacing between corresponding points on adjacent notches is alternately 36° and 54° in the instant case, the former corresponding to two revolutions of the shutter shaft and the latter to three revolutions of this shaft. Thus, with this arrangement, while the claw arm will swing up and down through one complete cycle during each revolution of the shutter shaft, it will only be permitted to swing forwardly into film engaging position to initiate an actual film pull-down operation during certain of the down strokes of the claw arm. The arrangement is such that when follower 29 moves into one of the notches 37 to engage the claws with the film the immediately following down stroke of the claw arm will advance the film one frame. At the end of this down-stroke the trailing edge 42 of notch 37 will cause the claws to disengage from the film and the claw arm will then swing upwardly. During the next revolution of the shutter shaft the follower 29 will be riding on the land 39 thus holding the claws in their rearward position wherein they are ineffective to produce a film pull-down operation. At the beginning of the next cycle of operation, the follower 29 will move into the next notch 38 to initiate another pull-down operation of the film and will thereupon move onto the land 40 and remain thereon throughout the remainder of that particular cycle and for the following two cycles. As a result film pull-down will occur in a staggered manner coincident with the first, third, sixth, eighth, etc. TV frames. It should be noted, however, that the average pull-down rate will be at the normal 24 frames-per-second rate.

While in the above description, specific gear ratios and angular spacings between notches on the cam 38 have been set forth, the invention is obviously not limited to these specific details. In order to obtain the desired 2—3—2 operation with the shutter shaft operating at 3600 r.p.m. it is merely necessary that the sprocket shafts rotate at the rate of $12/N$ revolutions per second, wherein N is an integer, and that the sprocket be designed so that for each revolution it will feed the film 2N frames. There must be N pairs of notches on the surface of the cam 28 and the spacing between corresponding points on adjacent notches should be $144°/N$ and $216°/N$ respectively.

Operation of the projector is believed to have been made apparent in the previous description. However, summarizing the operation, the film sprockets 17 and 18 will feed film to the vicinity of the gate at the conventional 24 frames per second. Since the shutter shaft is driven at 3600 r.p.m. (60 r.p.s.) an image will be projected once during each television field. While the film claw used to intermittently feed the film past the gate will likewise go through a complete up-and-down cycle during each television field it will, due to the staggered arrangement of the notches on the in-and-out cam 28, alternately skip one and then two complete field cycles between each actual film pull-down operation. Thus, the film will be advanced past the gate 2 frames during each 5 TV field cycles. However, the pull-down will occur only during that portion of a field period when the shutter is covering the gate aperture 9. Use of a 180° shutter permits a relatively high degree of illumination of the TV pickup tube and, at the same time, provides a relatively long time during which pull-down may be performed. With the modern TV camera tubes there is no particular need of phasing the projector with the TV cycle, it merely being necessary that the film be stationary whenever the shutter is open. The disclosed arrangement meets this requirement fully. Moreover, by mounting the in-and-out cam on the sprocket shaft the desired staggered intermittent pull-down action may be readily obtained without requiring the additional gearing and shafting or complicated drive arrangements which have been heretofore characteristic of projectors providing such 2—3—2 operation. By utilizing the principles of our invention almost any standard motion picture projector may be very readily converted for TV use with a minimum of expense, while at the same time, insuring extreme reliability of operation.

Obviously many changes can be made in the specific arrangement of the parts without departing from the principle of the invention or the scope and spirit of the invention as defined by the appended claims.

We claim:

1. In a motion picture projector having a projection gate provided with an aperture and means for feeding film through said projector including a continuously driven feed sprocket for feeding said film at a predetermined constant rate and a claw mechanism for intermittently advancing said film past said gate, said claw mechanism being mounted for advance and return movements in planes generally parallel to the plane of said film in the vicinity of said gate and for movement toward and away from said film plane into film engaging and disengaging positions respectively, a shutter shaft having a shutter thereon, the axis of said shutter shaft being substantially perpendicular to said film plane, means for rotating said shaft at a predetermined steady rate, a sprocket shaft oriented substantially at right angles to said shutter shaft and carrying said feed sprocket, gearing interconnecting said shafts whereby said sprocket shaft is rotated at a slower rate than said shutter shaft, means including a first cam on said shutter shaft with its periphery engaging said claw mechanism for controlling the advance and return movement of said claw mechanism, said shutter being arranged to cover said aperture during each advance movement of said claw and to uncover said aperture during each return movement thereof, and means including a second cam carried on said sprocket shaft and a lever engaging the periphery of said second cam and said claw mechanism for controlling the engaging and disengaging movements of said claw in predetermined timed relationship with the advance and return movements thereof to cause intermittent film advance past said gate.

2. In a motion picture projector as set forth in claim 1, the further improvement wherein said second cam is so arranged with respect to said first cam as to hold said claw mechanism in disengaged position for at least one complete advance and return cycle of said claw mechanism following each film advance operation.

3. In a motion picture projector as set forth in claim 1, the further improvement wherein said second cam is so arranged with respect to said first cam as to alternately hold said claw mechanism in disengaged position a different number of complete advance and return cycles of said claw number between successive film advance operations.

4. In a motion picture projector having a film gate provided with an aperture, means for feeding film through said projector including a feed sprocket for moving said film at a constant rate and a reciprocating claw mechanism for advancing such film intermittently past said gate, a shutter shaft, the axis of said shutter shaft being substantially perpendicular to the plane of said film at said gate, means for driving said shutter shaft at a predetermined rate, a sprocket shaft carrying said sprocket and oriented substantially at right angles to and geared to said shutter shaft, means including a cam carried by said shutter shaft with its periphery engaging said claw mechanism for reciprocating said clam mechanism to produce advance and return movements thereof in planes substantially parallel to said film plane, and means for imparting film engaging and disengaging movements to said claw mechanism toward and away from said film plane and in timed synchronism with said advance and return movements whereby to cause said claw mechanism to intermittently engage and advance said film past said gate, the improvement wherein said means for imparting engaging and disengaging movements to said claw mechanism comprises a lever carried by said projector and engaging said claw mechanism, said lever being mounted for swinging movement in a plane substantially at right angles to said film plane, and a second cam carried by said sprocket shaft and having a plurality of lever actuating surfaces on its periphery for thus swinging said lever.

5. In a motion picture projector as set forth in claim 4, the further improvement wherein the spacings between successive lever actuating surfaces of said second cam are different whereby the intervals between successive advancing movements of said film past said gate are correspondingly different.

6. A motion picture projector for projecting 60 images per second from motion picture film travelling therethrough at an average rate of 24 frames per second, said projector being provided with a projection gate having an aperture and means for feeding film through said projector including at least one film sprocket and a claw mechanism for intermittently advancing said film past said gate, said claw mechanism being mounted for advance and return movements in planes generally parallel to the plane of said film in the vicinity of said gate and for movement toward and away from said film plane into film-engaging and film-disengaging positions respectively, a shaft having a shutter thereon, the axis of said shutter shaft being substantially perpendicular to said film plane, means for rotating said shaft at a rate of 60 revolutions per second, said shutter being provided with an opening whereby said shutter alternately opens and covers said aperture during each revolution of said shutter shaft, a sprocket shaft carrying said sprocket and oriented substantially at right angles to said shutter shaft, and transmission means driving said sprocket shaft from said shutter shaft at $12/N$ revolutions per second wherein N is an integer, said sprocket being arranged to advance said film 2N frames per revolution of said sprocket shaft, means including a first cam carried by said shutter shaft with its periphery engaging said claw mechanism for causing an advance and a return movement of said claw mechanism during each revolution of said shutter shaft, and means including a second cam carried by said sprocket shaft and a lever engaging the periphery of said second cam and said claw mechanism for controlling the engaging and disengaging movement of said claw mechanism, said second cam having a plurality of engagement control surfaces spaced about the periphery thereof for controlling the engaging movement of said claw mechanism, the angular spacing between corresponding points of successive engagement control surfaces being alternately $144°/N$ and $216°/N$ respectively.

References Cited in the file of this patent
UNITED STATES PATENTS

| | | |
|---|---|---|
| 579,882 | Lumiere | Mar. 30, 1897 |
| 667,618 | Doyen | Feb. 5, 1901 |
| 2,521,957 | Whittel et al. | Sept. 12, 1950 |
| 2,633,773 | Frederick | Apr. 7, 1953 |
| 2,719,455 | Mitchell | Oct. 4, 1955 |
| 2,735,333 | Mitchell | Feb. 21, 1956 |
| 2,753,755 | Weissbrodt | July 10, 1956 |
| 2,788,703 | Holman | Apr. 16, 1957 |
| 2,797,612 | Holmes | July 2, 1957 |
| 2,819,647 | Golick et al. | Jan. 14, 1958 |

FOREIGN PATENTS

| | | |
|---|---|---|
| 333,543 | Italy | Jan. 2, 1936 |
| 682,095 | Germany | Oct. 7, 1939 |
| 1,125,536 | France | July 16, 1956 |